(12) United States Patent
Fisher et al.

(10) Patent No.: US 7,827,599 B2
(45) Date of Patent: *Nov. 2, 2010

(54) SELF-SERVICE PROVISIONING OF DIGITAL CERTIFICATES

(75) Inventors: Mark Fisher, Belmont, CA (US); Andrew B. Philips, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1062 days.

This patent is subject to a terminal disclaimer.

(21) Appl. No.: 10/850,521

(22) Filed: May 19, 2004

(65) Prior Publication Data

US 2005/0262346 A1 Nov. 24, 2005

(51) Int. Cl.
*G06F 7/04* (2006.01)
(52) U.S. Cl. .............................. 726/5; 726/18; 726/19; 713/155; 713/156; 713/157
(58) Field of Classification Search ............... 726/2, 726/26; 713/150
See application file for complete search history.

(56) References Cited

U.S. PATENT DOCUMENTS

| 6,035,398 | A | * | 3/2000 | Bjorn | 713/186 |
|---|---|---|---|---|---|
| 6,550,012 | B1 | * | 4/2003 | Villa et al. | 726/11 |
| 7,260,724 | B1 | * | 8/2007 | Dickinson et al. | 713/182 |
| 7,305,550 | B2 | * | 12/2007 | Oliver et al. | 713/156 |
| 2001/0051996 | A1 | * | 12/2001 | Cooper et al. | 709/217 |

* cited by examiner

*Primary Examiner*—Pramila Parthasarathy
(74) *Attorney, Agent, or Firm*—Park, Vaughan, Fleming & Dowler LLP

(57) ABSTRACT

A system and method for provisioning digital certificates. An automated provisioning engine receives notification of a need to provision a user with a digital certificate. The engine electronically instructs the user to obtain a digital certificate. When obtained, the user responds by forwarding the certificate. The engine then electronically instructs a trusted or provisioned user to verify that the user obtained the digital certificate. The trusted user verifies this, and may obtain the user's certificate or a fingerprint of the certificate to include in a response to the provisioner's instructions. If verified, and if the certificate or fingerprint matches the certificate provided by the user, the user's digital certificate is then activated, to allow it to represent the user in public key transactions.

18 Claims, 2 Drawing Sheets

SELF-SERVICE PROVISIONING OF DIGITAL CERTIFICATES

BACKGROUND

This invention relates generally to the field of computer systems. More particularly, a system and method are provided for securely and automatically provisioning digital certificates.

PKI (Public Key Infrastructure) technology is used to provide verifiable security for digital data. With PKI technology, a person generates or is issued corresponding private and public keys. The private key is a secret (e.g., a large number) known only to that person. The corresponding public key can be made available to the public or specific people with whom the person wants to securely exchange information. The security is verifiable in that a person's public key will only unlock the information if the information was secured with the person's corresponding private key, and vice versa.

Applying a private key to electronic data generates a digital signature, which can be used as a digital guarantee that the data has not been altered. The digital signature is actually an encrypted digest of the data, generated using a one-way hash function. The recipient decrypts the digest that was sent and also re-computes the digest from the received unencrypted data. If the digests match, the data is proved to be intact and tamper free from the sender.

The digital signature thus ensures that the data originated with the entity signing it and that it was not tampered with after the signature was applied. However, the sender could still be an impersonator and not who he or she claims to be. A digital certificate, issued by a trusted Certificate Authority (CA), may be needed to verify that the message was indeed sent by the person or organization claiming to send it. The digital certificate comprises the person's public key and, depending on the nature of the certificate and the level of trust granted the CA, can provide assurance that the public key—and the corresponding private key—belong to the person they are alleged to belong to.

However, some digital certificates can be obtained with little verification of the identity of the obtainor. To illustrate the problem, consider three entities: Entity A (a legitimate user or organization), Entity B (a recipient of a digital signature from an entity purporting to be Entity A) and Entity C (a fraudulent user or organization).

To implement digital signatures it is required that a signer be issued a private key and a corresponding public certificate containing the signer's public key. The signer (Entity A) will make use of his private key to digitally sign a document, with the recipient (Entity B) using Entity A's public certificate to verify the signature.

It is vital that the recipient of the signature (Entity B) be very sure that the certificate used for verification is the bona fide certificate belonging to Entity A. If another entity (Entity C) manages to get Entity B to believe that her (Entity C's) own certificate belongs to Entity A, then Entity C can effectively forge Entity A's signature (at least well enough to fool Entity B).

Compounding this issue is the scenario where Entity B is an organization that wishes to issue certificates to its employees (e.g., Entity A). Entity B needs some way of confirming that the private key was successfully received by Entity A and not by Entity C (for example, an unscrupulous co-worker), otherwise Entity C could forge Entity A's signature.

There are various schemes for dealing with these issues, usually involving some sort of network of trust. One example includes Entity A being responsible for acquiring his own key, and then passing along the public certificate in person (or by some other secure method that ensures identity) to a representative of Entity B, which can then ensure that the certificate is bona fide. This method can be cumbersome, however, particularly if Entity A is not technically (and security) savvy.

SUMMARY

In one embodiment of the invention, a system and method are provided for self-service provisioning of digital certificates. An organization's automated provisioner or provisioning engine receives notification of a need to provision a user with a digital certificate. The engine electronically instructs the user to obtain a digital certificate from an issuing authority, in accordance with the prevailing policies of the organization. The issuing authority may be administered by the same organization, by a third party, or even by the user.

When obtained, the user responds to the provisioner's instructions and forwards the certificate. The engine then electronically instructs a trusted or provisioned user (e.g., the user's supervisor) to verify that the user obtained the digital certificate. This helps ensure that some other person is not trying to register a certificate in the user's name.

The trusted user verifies that the user did obtain and forward his or her certificate, and may obtain the certificate or a fingerprint of the certificate to include in a response to the provisioner's instructions. If verified, and if the certificate or fingerprint matches the certificate provided by the user, the user's digital certificate is then activated, meaning that those systems relying on the provisioner will now accept the certificate as representing the user in public key transactions.

The various instructions and responses may be transmitted via electronic mail, an electronic workflow application or utility, or via other electronic means.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

In one embodiment of the invention, a system and method are provided for self-service provisioning of digital certificates. Provisioning a certificate entails obtaining a digital certificate, and registering the certificate with an organization or other entity that will make the certificate available to others with an assertion of trust that the certificate belongs to the person it purports to belong to. The provisioning is self-service in that little action is necessary on the part of the organization, and that action may be performed automatically.

One implementation of this embodiment is well-suited for use in a notification-based environment such as Oracle® Workflow by Oracle Corporation, in which events in a workflow are communicated among actors. Other implementations may be adapted for an electronic mail based system of notifications.

Figure 1:
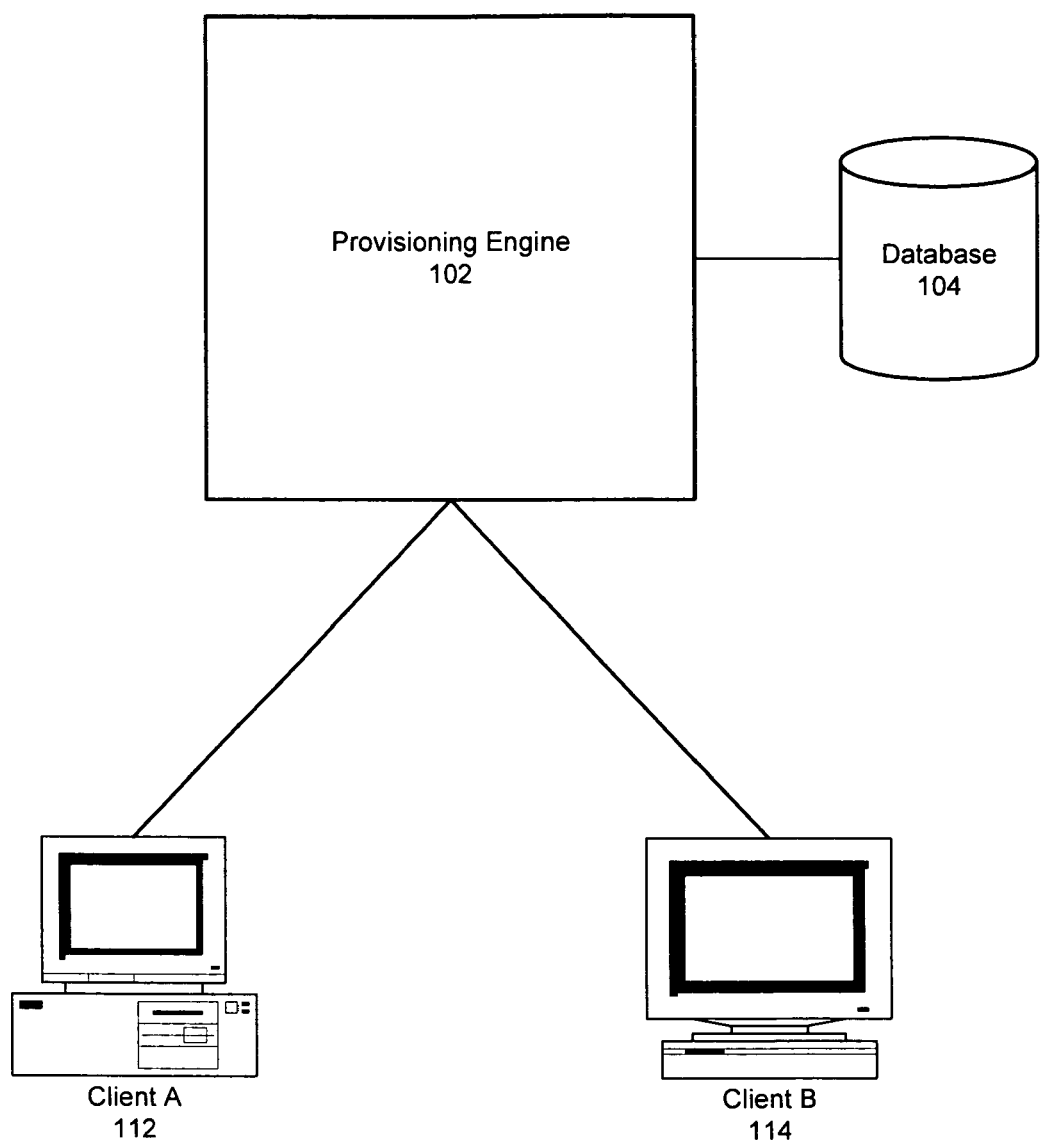
FIG. 1 depicts a computing environment in which an embodiment of the present invention may be implemented.

FIG. 1 demonstrates a computing environment in which an embodiment of the invention may be implemented. In this embodiment, provisioning engine 102 is a set of executable code designed to facilitate the provisioning of digital certificates. Engine 102 may execute on virtually any type of computer or computing device, such as a workstation, web server, application server, database server, etc.

Provisioning engine 102 is coupled to database 104, which may be configured to register and store digital certificates as a trusted repository. Users can therefore retrieve public certificates from database 104 and trust that a certificate purporting to belong to a particular user does actually belong to that user. Engine 102 and database 104 may be colocated or may be separated by any physical or logical distance, and may be coupled via any type of wired and/or wireless communication links.

Provisioning engine 102 is also coupled to any number of client computing devices, such as Client A 112 and Client B 114. Clients may include desktop, portable, hand-held and/or other types of computing devices. Clients may be coupled to engine 102 via dedicated (e.g., dial-up) and/or shared (e.g., network) links, which may be wired and/or wireless. In one implementation, any number of clients may be coupled to provisioning engine 102 via the Internet or an intranet.

Client A and Client B, and provisioning engine 102 may be configured to exchange electronic mail, and may also be configured with software for managing a flow of work (e.g., Oracle® Workflow).

Figure 2:
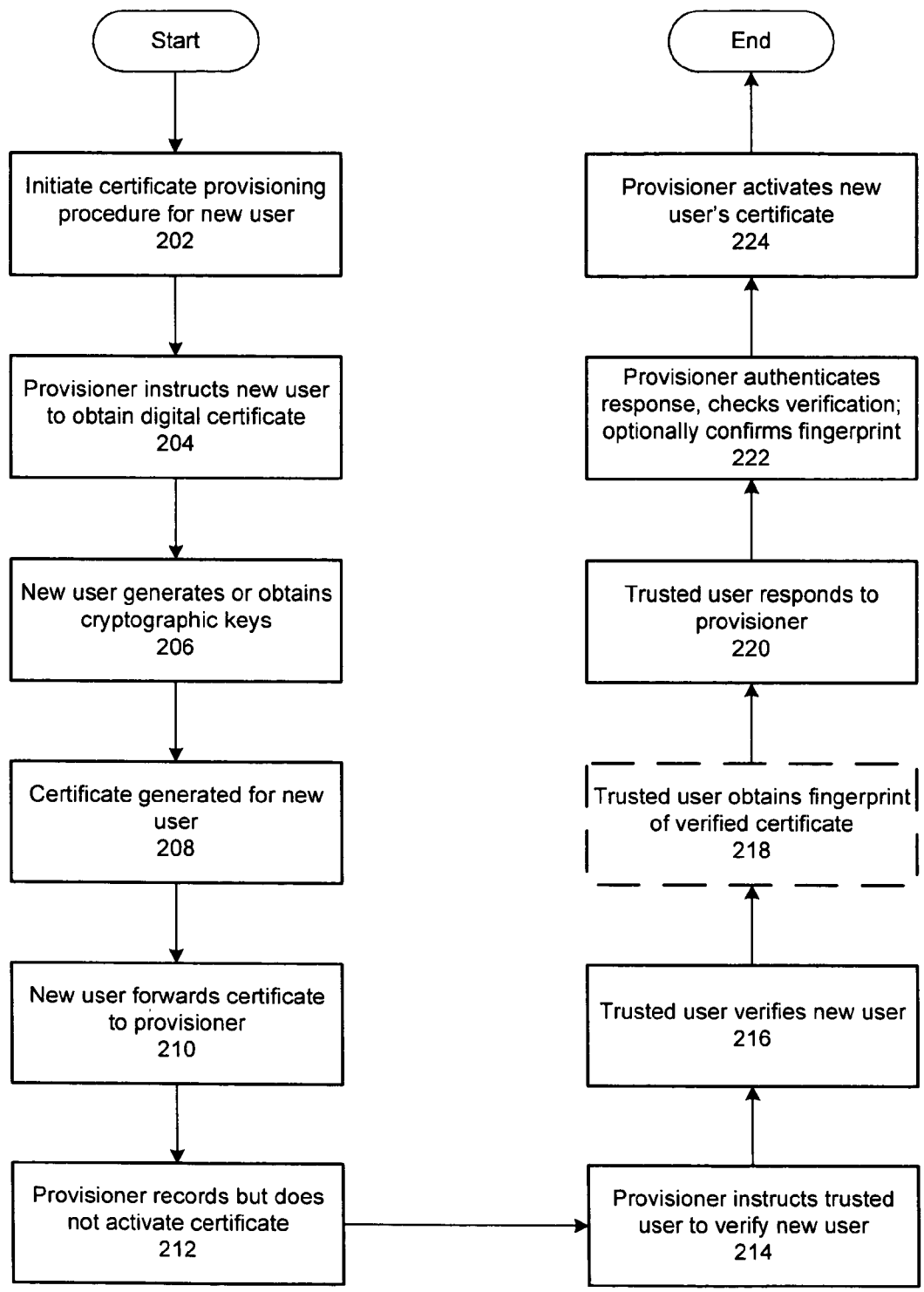
FIG. 2 is a flowchart illustrating one method of self-service provisioning of digital certificates, in accordance with an embodiment of the invention.

FIG. 2 is a flowchart demonstrating a method of provisioning digital certificates, according to one embodiment of the invention. This embodiment may be implemented in a computing environment such as that depicted in FIG. 1.

In different implementations of this embodiment, the various instructions, notifications and so on are communicated via electronic mail, a workflow application or utility, or in some other automated, electronic fashion.

In state 202, a procedure is initiated for provisioning a digital certificate for a user. In different implementations, the procedure may be initiated by the user, by the user's supervisor, by a member of an information technology staff, by a human resources staff member (e.g., for a new employee), or virtually any other member of an organization requiring the user to have a digital certificate. Illustratively, the procedure may be initiated at a webpage on a company's intranet, as part of a workflow application or utility, via electronic mail, or in some other manner.

In state 204, a provisioner (e.g., provisioning engine 102) electronically instructs the user to obtain a digital certificate. In one implementation of this embodiment, the instructions are sent automatically following initiation of the procedure in state 202, and may require a response in order to keep the procedure moving along.

The instructions may indicate how the user may obtain a certificate or where to obtain it. The user's organization may be able to generate digital certificates, or the user may be directed to a commercial Certificate Authority (CA). The instructions may also indicate how to install the keys and/or certificate in the user's browser.

In state 206, the user generates or obtains a private and a public key. The user may employ a commercial service to generate the keys, or may create them himself. In one implementation, the user may obtain keys from the provisioner.

In state 208, the user generates or obtains a digital certificate. He may generate himself (e.g., with his browser) once the keys obtained in state 206 are available, or may again employ a commercial service.

In state 210, the user electronically responds (e.g., via electronic mail, via a workflow application) to the instructions received in state 204. The user's certificate is forwarded with the response, and the response is signed with his digital signature, thereby indicating to the provisioner that he successfully executed the instructions.

In state 212, the provisioner receives the user's response and extracts the enclosed certificate. The provisioner may verify the user's signature by ensuring that it is well formed.

In this embodiment of the invention, the certificate is recorded if the digital signature is well formed, but the certificate is not yet authorized or activated, and thus is not yet made available to other users. In particular, the provisioner maintains new certificates in limbo or other temporary state until additional verification or authentication of the user is performed.

In state 214, the provisioner electronically instructs a trusted user to confirm the identity of the user. The trusted user is a user having a fully authorized or activated certificate registered with the provisioner. Illustratively, the trusted user (e.g., the user's supervisor, the user's administrate assistant) may have been identified in state 202 when the procedure was initiated, or may be selected based on the department, office, group or other division of users in which the user is located. A response is required from the trusted user before the procedure can continue.

In state 216, the trusted user vouches for the user's identity. The trusted user may already know the user, and therefore may simply confirm with the user that he obtained the certificate that was passed to the provisioner. This action helps ensure that someone else did not attempt to register a certificate in the user's name.

In optional state 218, the trusted user may obtain the fingerprint of the user's certificate (e.g., via the user's browser in which the certificate is installed). The fingerprint may be obtained via electronic mail, as part of an electronic workflow, manually, or in some other manner.

In state 220, the trusted user responds to the provisioner. The trusted user's response may include the user's certificate and/or fingerprint, and may be digitally signed by the trusted user. If the trusted user cannot confirm in her response that the user had indeed obtained a certificate and forwarded it to the provisioner, the procedure may be aborted.

In state 222, the provisioner authenticates the trusted user's response, to ensure that it came from the trusted user. The provisioner may compare the certificate fingerprint received in the trusted user's response (if sent) with a fingerprint of the certificate sent by the user in state 210. If this comparison fails, the procedure is aborted or returns to a previous state for error recovery.

In state 224, the user's certificate has been authenticated and so the provisioner activates or registers it.

In one alternative embodiment of the invention, only digital certificates issued by specific certificate authorities are accepted by the provisioner. Thus, the provisioner's instructions may identify the acceptable CAs, and the provisioner may reject any certificate from other CAs.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer-implemented method comprising:
   instructing an un-provisioned user to obtain a digital certificate;
   receiving, at a provisioning computer, a response from the un-provisioned user, wherein the response includes the digital certificate and a fingerprint of the digital certificate;
   storing the digital certificate and the fingerprint without activating the digital certificate;
   prior to activating the digital certificate, instructing a trusted user who has an activated digital certificate to verify the received digital certificate, which comprises instructing the trusted user to confirm with the un-provisioned user that the un-provisioned user has obtained the digital certificate, and to receive from the un-provisioned user the fingerprint of the digital certificate;
   receiving from the trusted user a response that includes the fingerprint of the digital certificate;
   comparing the received fingerprint with the stored fingerprint; and
   activating the digital certificate in response a fingerprint match.

2. The method of claim 1, wherein said activating comprises making the digital certificate available to other users.

3. The method of claim 1, wherein said activating comprises allowing the certificate to represent the un-provisioned user in a public key transaction.

4. The method of claim 1, further comprising:
   providing the un-provisioned user with one or more cryptographic keys to facilitate generation of the digital certificate.

5. The method of claim 1, further comprises receiving a notification of a need to provision a digital certificate from the un-provisioned user.

6. The method of claim 5, wherein said notification of a need to provision a digital certificate is received from the trusted user.

7. The method of claim 1, wherein:
   each said receiving comprises receiving an electronic workflow notification; and
   each said instructing comprises sending an electronic workflow notification.

8. The method of claim 1, wherein:
   each said receiving comprises receiving an electronic mail message; and
   each said instructing comprises sending an electronic mail message.

9. A computer readable memory storage medium, storing instructions that, when executed by a provisioning computer, cause the computer to perform a method of provisioning a digital certificate, the method comprising:
   instructing an un-provisioned user to obtain a digital certificate;
   receiving, at a provisioning computer, a response from the un-provisioned user, wherein the response includes the digital certificate and a fingerprint of the digital certificate;
   storing the digital certificate and the fingerprint without activating the digital certificate;
   prior to activating the digital certificate, instructing a trusted user who has an activated digital certificate to verify the received digital certificate, which comprises instructing the trusted user to confirm with the un-provisioned user that the un-provisioned user has obtained the digital certificate, and to receive from the un-provisioned user the fingerprint of the digital certificate;
   receiving from the trusted user a response that includes the fingerprint of the digital certificate;
   comparing the received fingerprint with the stored fingerprint; and
   activating the digital certificate in response to a fingerprint match.

10. A computer-implemented self-service method of provisioning a digital certificate, the method comprising:
    receiving, from an automated provisioner of digital certificates, instructions to obtain a digital certificate at a un-provisioned user's computer;
    obtaining the digital certificate;
    sending a response to the instructions to the provisioner, wherein the response includes the digital certificate and a fingerprint of the digital certificate; and
    confirming obtainment of the digital certificate to a trusted user who has an activated digital certificate and is registered with the automated provisioner, wherein confirming comprises sending the fingerprint of the digital certificate to the trusted user.

11. The method of claim 10, wherein said obtaining comprises:
    obtaining a set of cryptographic keys.

12. The method of claim 11, wherein said sending comprises:
    digitally signing the response using the set of cryptographic keys.

13. The method of claim 10, wherein the instructions include a set of cryptographic keys.

14. The method of claim 13, further comprising:
    installing the cryptographic keys on a local browser.

15. The method of claim 10, wherein said confirming further comprises:
    transmitting the digital certificate to the trusted user.

16. A computer readable memory storage medium, storing instructions that, when executed by a computer, cause the computer to perform a self-service method of provisioning a digital certificate, the method comprising:
    receiving, from an automated provisioner of digital certificates, instructions to obtain a digital certificate at an un-provisioned user's computer;
    obtaining the digital certificate;
    sending a response to the instructions to the provisioner, wherein the response includes the digital certificate and a fingerprint of the digital certificate; and confirming obtainment of the digital certificate to a trusted user who has an activated digital certificate and is registered with the automated provisioner, wherein confirming comprises sending the fingerprint of the digital certificate to the trusted user.

17. An apparatus for provisioning a digital certificate, comprising:
- a database configured to store digital certificates;
- a communication link coupling the apparatus to a plurality of client computing devices; and
- an automated provisioner configured to:
  - instruct an un-provisioned user to obtain a digital certificate;
  - receive, from the un-provisioned user, the un-provisioned user's digital certificate and a fingerprint of the digital certificate;
  - prior to activating the digital certificate, instruct a provisioned user who has an activated digital certificate to verify the received digital certificate at the provisioned user's computer, which comprises instructing the provisioned user to confirm with the un-provisioned user that the un-provisioned user has obtained the digital certificate, and to receive from the un-provisioned user the fingerprint of the digital certificate;
  - receive from the provisioned user a response that includes the fingerprint of the digital certificate;
  - compare the received fingerprint with the stored fingerprint; and
  - activate the digital certificate in response to a fingerprint match.

18. The apparatus of claim 17, wherein said automated provisioner is further configured to:
- store the un-provisioned user's digital certificate in an inactive state when received from the un-provisioned user.

* * * * *